(12) United States Patent
Haasis et al.

(10) Patent No.: US 6,831,256 B2
(45) Date of Patent: Dec. 14, 2004

(54) SUPER-THIN RESTAURANT GRIDDLE

(75) Inventors: Hans Haasis, Downey, CA (US);
Donald Hyatt, Sr., Downey, CA (US);
Donald Hyatt, Jr., Downey, CA (US)

(73) Assignee: Omniteam, Inc., Downey, CA (US)

(*) Notice: Subject to any disclaimer, the term of this patent is extended or adjusted under 35 U.S.C. 154(b) by 68 days.

(21) Appl. No.: 10/271,478

(22) Filed: Oct. 15, 2002

(65) Prior Publication Data

US 2004/0069767 A1 Apr. 15, 2004

(51) Int. Cl.⁷ ............................................. H05B 3/68
(52) U.S. Cl. ............................ 219/465.1; 219/450.1
(58) Field of Search ...................... 219/443.1, 450.1, 219/465.1, 466.1, 467.1, 468.1, 468.2, 527, 528, 529, 544, 545, 546, 547, 548, 549

(56) References Cited

U.S. PATENT DOCUMENTS

| | | |
|---|---|---|
| 2,817,844 A | 12/1957 | Free |
| 3,031,739 A * | 5/1962 | Boggs ........................ 29/613 |
| 3,231,718 A * | 1/1966 | Vasile ...................... 219/450.1 |
| 3,281,579 A | 10/1966 | Glicksman |
| 3,334,414 A * | 8/1967 | Hocker ........................ 29/611 |
| 3,440,404 A | 4/1969 | Prescott |
| 3,739,148 A | 6/1973 | Ryckman, Jr. |
| 3,829,655 A | 8/1974 | Thibault |
| 4,215,267 A | 7/1980 | Kaebitzsch |
| 4,253,013 A | 2/1981 | Mabuchi |
| 4,417,867 A | 11/1983 | Bauer |
| 4,459,472 A | 7/1984 | Morris et al. |
| 5,078,050 A | 1/1992 | Smith |
| 5,269,217 A | 12/1993 | Goad |
| 5,345,063 A * | 9/1994 | Reusche et al. ............ 219/441 |
| 5,374,807 A * | 12/1994 | Yahav et al. ............. 219/466.1 |
| 5,520,103 A | 5/1996 | Zielinski et al. |
| 5,961,866 A | 10/1999 | Hansen |
| 6,021,710 A | 2/2000 | Violi et al. |
| 6,100,504 A | 8/2000 | Wagner |
| 6,252,204 B1 * | 6/2001 | Po-Hei ................... 219/450.1 |
| 6,262,394 B1 | 7/2001 | Shei et al. |
| 6,376,803 B1 | 4/2002 | Klinger |

OTHER PUBLICATIONS

"Flexible Heaters," by Benchmark Thermal, http://www.benchmarkthermal.com/flex.htm, printout dated Sep. 19, 2002.

\* cited by examiner

*Primary Examiner*—Sang Paik
(74) *Attorney, Agent, or Firm*—Fulwider Patton Lee & Utecht LLP

(57) ABSTRACT

A thin food heating unit suitable for use as a restaurant griddle includes a silicone rubber heating blanket vulcanized to the underside of a highly thermally conductive metal food warming plate for heating a food item placed thereon, a base insulated from the heating blanket and the food warming plate by a high temperature ceramic fiber insulation, insulating standoffs between the food warming plate and the top of the base, a separate power supply which supplies electrical energy to the griddle at a relatively low voltage compared to standard line voltage, and a power controller including an on/off switch which is separate from the base and which can be mounted separately in a restaurant installation.

8 Claims, 2 Drawing Sheets

SUPER-THIN RESTAURANT GRIDDLE

RELATED APPLICATIONS

None.

FIELD OF THE INVENTION

This invention relates to heated assemblies for use in food preparation. More particularly, the present invention relates to a super-thin, lightweight restaurant griddle.

BACKGROUND OF THE INVENTION

Hot plates, electric frying pans, and the like are well known within the fields of domestic cooking and institutional food service preparation and service. Such devices commonly include a thermally conductive surface, electrical heating rods or an electrical heating foil underneath the surface for heating it, thermal insulation to contain the heat created by the electrical rods or heating foil, and a shell for containing the foregoing elements. U.S. Pat. No. 2,152,126 issued to Young discloses a heating device which uses a copper plate or disc and a coiled heating unit. U.S. Pat. No. 4,527,050 issued to Kicherer discloses a hot plate which uses a thin resistive material film to heat the hot plate. Resistive films have been used in similar applications. U.S. Pat. No. 3,869,596 issued to Howie discloses an electrical cookware heater in which a foil heater is adhesively bonded to a dielectric substance which is in turn adhesively bonded to a ceramic glass cooking surface. U.S. Pat. No. 5,374,807 issued to Yahav et al. discloses a domestic cooking apparatus with a cooking surface, an electrically insulative layer below the cooking surface, a foil heating element below the insulative layer, a thermal and electrical insulation layer below that, and a support layer, with the latter elements being biased up against the cooking surface by a spring.

SUMMARY OF THE INVENTION

In accordance with the present invention, a novel construction for a cooking apparatus is provided which allows the apparatus to be extremely thin yet reach and maintain a relatively high temperature. In an exemplary embodiment, the entire assembly stands only approximately 3.8 centimeters tall, but is capable of heating food to over 400 degrees F. In the embodiment, a metal plate made of a highly thermally conductive material such as aluminum forms the cooking surface. Bonded to the cooking surface and immediately below it is a very thin flexible heating blanket. In the embodiment, the heating blanket is made of silicone rubber with a structural reinforcing material for strength such as glass fibers embedded therein, and resistive heating elements also embedded with the silicone sheet. The aluminum plate is fastened to a stainless steel base. The base does not directly contact either the aluminum plate or the heating blanket. Within the base is a high temperature ceramic fiber insulation material which is capable of withstanding very high temperatures without degradation. A separate high temperature insulator also acts as a standoff to separate the aluminum plate from the base to which it is affixed. Because the unit is so thin it is advantageous to mount a temperature controller such as an on-off switch or a variable temperature controller externally to the unit. The unit can thus take up only a very small amount of vertical space on a countertop or when mounted as a shelf or on a shelf, with the controller being mounted somewhere where vertical space is not at such a premium, such as on a vertical wall or vertical member which otherwise represents unused vertical area.

In one aspect, therefore, the invention is of a super thin yet high temperature assembly for heating food which includes a generally flat metal plate having a top surface and an underside for directly contacting a food item placed on the top surface, a thin fiberglass reinforced silicone heating blanket vulcanized or otherwise adhered to the underside of the metal plate with the heating blanket covering most of the underside of the metal plate, a stainless steel base having sides which bend upwards and underneath at least a portion of the metal plate, a high temperature ceramic insulation material within the base, a second high temperature insulation material disposed between the metal plate and the top wall of the base in a region in which the metal plate overlies the top wall, the assembly being very thin, with a power controller for controlling the power which is dissipated within the heating blanket being spatially separated from the rest of the unit and mounted separately.

BRIEF DESCRIPTION OF THE DRAWINGS

Exemplary embodiments of the invention will be further described below with reference to the drawings, in which like numbers refer to like parts.

DETAILED DESCRIPTION OF EXEMPLARY EMBODIMENTS

Figure 1:
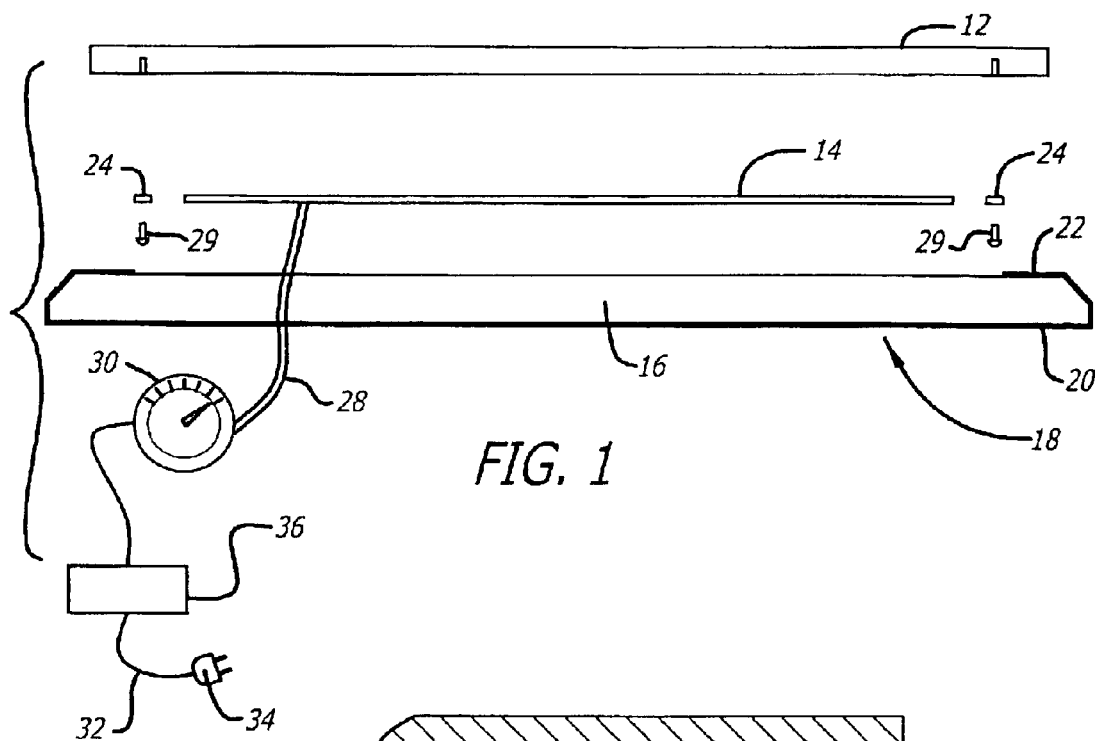
FIG. 1 is an exploded partial sectional side elevation view of an exemplary embodiment of the griddle of the present invention including the power supply elements.

FIG. 1 is an exploded side elevation view of one exemplary embodiment of the griddle of the present invention. The heating unit assembly 10 includes a plate or panel 12 made from a highly thermally conductive material such as aluminum or copper. Such materials could include hard anodized aluminum such as is commonly used in cooking items, aluminum coated with PTFE, TEFLON®, or other known materials and coatings for surfaces on which food can be directly heated or cooked. Alternatively, plate 12 could be made of other metals such as steels commonly used in restaurant grills. In another embodiment, the plate 12 need not necessarily be a plate on which food can be directly cooked. Plate 12 could, for example, be a plate on which a pot, pan, or other food container could be placed. In the exemplary embodiment shown the heating unit assembly 10 also includes a thin flexible heating blanket 14. In the embodiment, heating blanket 14 is a silicone heating blanket less than 0.5 cm thick, or approximately 0.32 cm (approximately one-eighth inch) thick with fiberglass embedded therein for structural reinforcement, and electrical resistive wires embedded within the silicone. Such silicone heating blankets intended for industrial uses such as industrial processes are available from Benchmark Thermal Corporation of Grass Valley, Calif. Heating blanket or sheet 14 is preferably vulcanized to plate or panel 12 thus adhering the two pieces together in good thermal contact.

Alternatively, heating blanket 14 could be adhered to panel 12 by other means such as a silicone adhesive. Heating assembly 10 further comprises a base unit 18 generally underneath the heating blanket 14. Base 18 includes a high temperature insulation material 16 such as a ceramic fiber mat insulation known in the trade as K-LITE™, and which is available from Great Lakes Textiles Inc. of Walton Hills, Ohio. Other insulation materials could also be used. Preferably, the insulation material 16 is a high temperature insulation capable of withstanding sustained temperatures of at least 500° F. without significant degradation or release of harmful or noxious gasses. The shell of base 18 is preferably made of stainless steel for reasons of aesthetics and easy cleaning, but could be made of other materials. As shown more fully in FIG. 5, base unit 18 includes ends 20 which bend upwards and over to thereby extend underneath a portion of base plate 12. In the exemplary embodiment, a screw extends upwardly through the top wall 22 of the base unit and into a tapped hole within base plate 12. Base plate 12 and base top wall 22 are separated by a standoff 24 which is preferably made of a suitable high temperature thermal insulator such as mica. If the griddle is not intended to be used at very high temperatures, other thin insulators such as phenolic sheet could be used. In the embodiment shown, bolt 29 extends through a hole which is provided in mica standoff 24. Many other means of fastening heating plate 12 to base unit 18 will be apparent to those skilled in the relevant art. Returning to FIG. 1, flexible heating blanket 14 is provided electrical power via electrical cord 28 or a set of individual wires. In the area near heating blanket 14, the wires are preferably high temperature wires with high temperature insulation. Electrical cord 28 could include a grounding wire for grounding the base unit 18 and/or heating plate 12 to the safety ground of the building through electrical plug 34. Power may be provided to the unit from a standard power supply such as 120 VAC through electrical plug 34 and electrical cord 32. Optionally, a transformer or other power converter 36 converts the line voltage to a low voltage such as 12 VAC or 24 VAC. The down conversion of the high voltage AC to a low voltage AC or DC eliminates the regulatory requirement for a safety ground to the unit, and other safety and practical requirements for a unit operating at line voltage. Regardless of whether the line voltage is down converted to a lower voltage before being passed to the electrical heating blanket, a power or temperature controller 30 preferably controls power to heating blanket 14. Power controller 30 could be a simple on-off switch or could be a variable controller for controlling either continuously or in discrete steps the amount of power which reaches heating blanket 14. Optionally, power converter 36 could be incorporated within power controller 30.

Figure 6:
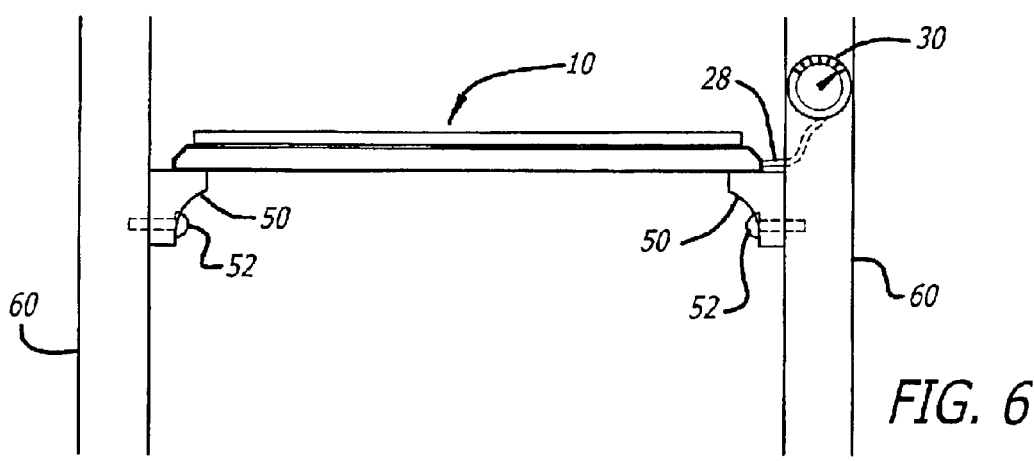
FIG. 6 shows one possible installation of the griddle in which it is mounted between two vertical support members and the power controller is mounted on one of the vertical support members.
Figure 2:
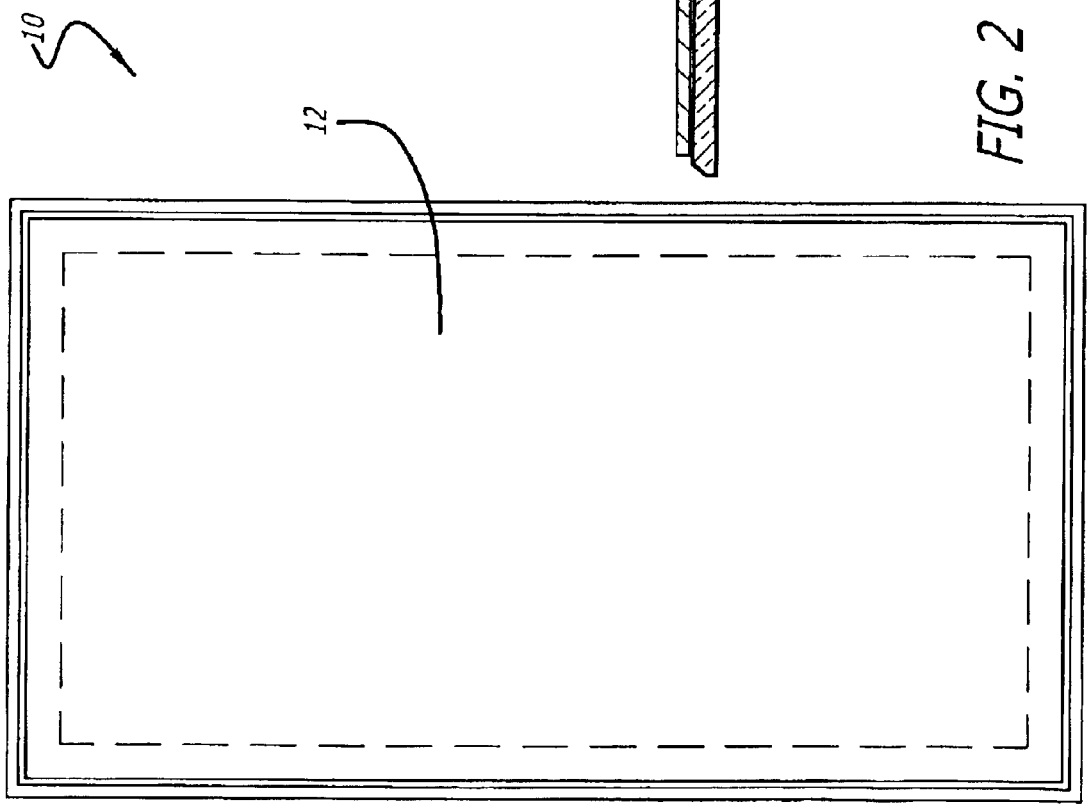
FIG. 2 is a top plan view of the griddle.

FIG. 2 is a top plan view of the griddle according to the exemplary embodiment. Heating blanket 14 which is adhered to the underside of plate 12 is shown in phantom. The heating blanket is adhered to a large percentage of the metal plate 14 in order to ensure even and consistent heat distribution across plate 12. Preferably, therefore, heating blanket 14 covers at least half of the underside of metal plate 12, more preferably covers at least three-quarters of the underside of metal plate 14, and most preferably covers at least 90 percent of the underside of metal plate 12. The griddle and heating blanket need not be rectangular as shown, but could be square, or any other shape including round. A square or rectangular griddle would be well suited for the heating unit 10 to be mounted as a shelf, as for example in FIG. 6, whereas a round griddle might be well suited for use as a tortilla warmer on an existing shelf, counter or surface while requiring a minimum amount of counter space.

Figure 3:
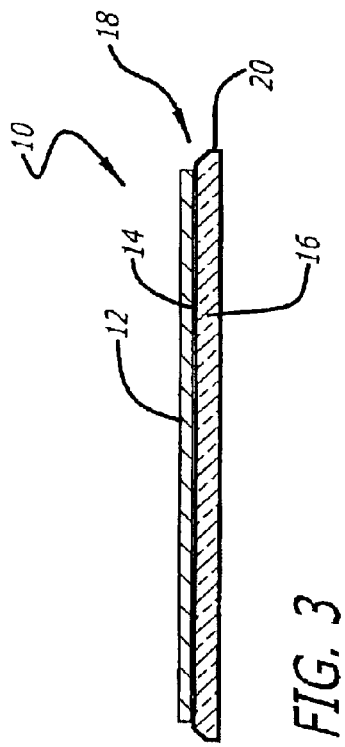
FIG. 3 is a sectional view of the griddle of the present invention taken along a transverse axis.

FIG. 3 is a sectional view of the griddle according to the exemplary embodiment of the present invention taken along a transverse axis. In the exemplary embodiment, the metal plate 12 is approximately 1.3 cm (approximately one-half inch) thick, the base unit 18 is approximately 2.2 cm (approximately seven-eighths inch) thick, and the gap between the metal plate and the base unit is approximately 0.32 cm (approximately one-eighth inch) thick. Thus, in the exemplary embodiment, the overall nominal height of the unit is approximately 3.8 cm (approximately 1½ inch). In the exemplary embodiment, therefore, the unit is less than approximately four centimeters thick, and therefore necessarily less than approximately five centimeters thick and less than approximately six centimeters thick. Preferably, the gap between metal plate 12 and top wall 22 of the base unit is sufficiently wide so that a person can slip an edge of a towel into the gap to thoroughly clean the base unit 18 without crumbs being stuck between base top wall 22 and metal plate 12.

Figure 4:
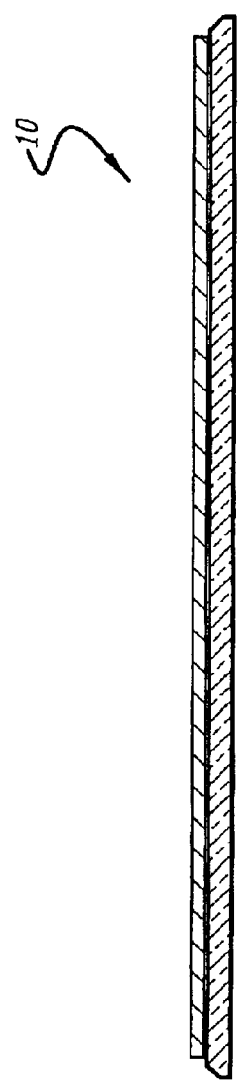
FIG. 4 is a sectional view of the griddle taken along a longitudinal axis.

FIG. 4 is a sectional view of the griddle of the exemplary embodiment taken along a longitudinal axis.

Figure 5:
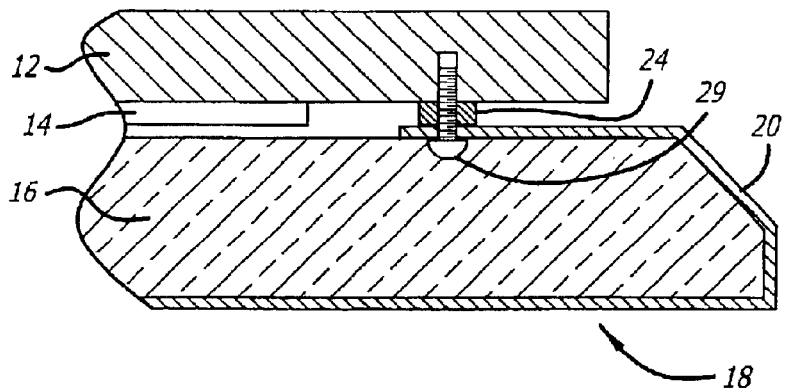
FIG. 5 is a partial fragmentary sectional view of one corner of the griddle.

FIG. 5 is a partial fragmentary sectional view of one corner of the griddle. Metal plate 12, heating blanket 14, insulation material 16 within base unit 18, insulating standoff 24, and fastener 29 are shown. Other methods of fastening plate 12 to base unit 18 will be readily apparent, including adhesives, rivets, and other techniques. It is also preferable but not strictly necessary that standoff 24 be a good thermal insulator, particularly if the standoff is recessed sufficiently far underneath the outer edge of plate 12 such that conduction through standoff 24 and into the top wall 22 and sidewall 20 of the base unit would not present a safety hazard. In addition, other constructions of the sides of the base unit are possible, as will be apparent to one skilled in the relevant art. Furthermore, it is not necessary that metal plate 12 be raised above the top surface 22 of the base unit. For example, plate 12 could be recessed within the base unit provided that plate 12 is sufficiently thermally insulated from the top wall 22 or sidewall 20 in order to avoid presenting a safety hazard to operators of the griddle or persons or objects nearby, particularly in view of the temperature at which the plate will be operated and the environment in which it will be used.

FIG. 16 illustrates one possible installation of the griddle. Brackets such as shelf supports 50 are held to vertical members 60 by any one of various well known means including threaded fasteners 52. The vertical members could be, for example, chases within a fast food restaurant. In the installation shown, the heating unit is mounted as its own shelf. Alternatively, the heating unit could be mounted on an existing shelf, placed on an existing counter, or used in any other places or environments in which a griddle could be used. As shown, power cord 28 leads from the heating assembly 10 to controller 30 mounted on vertical member 60. The installation shown in the figure is particularly well suited for use as a tortilla warmer within fast food restaurants where space is at a premium and where it is particularly important to reduce the amount of walking or other movements which the worker preparing and assembling food must make. By providing a super thin and lightweight griddle which may be mounted as its own shelf or on a existing shelf directly within reach of a worker assembling food such as tortilla items, the present invention allows the restaurant to provide food which includes hot tortillas to customers, without significantly increasing the amount of space which must be provided for the preparation and assembly of such items, and without significantly increasing the walking or other movements required of the workers. When used as a tortilla warmer within a fast food restaurant, for reasons of safety and simplicity, it may be preferable that power controller 30 is merely an on-off switch which turns on heating assembly 10 to a specified predetermined temperature at the top surface of plate 12, such as approximately 200 degrees F. In other embodiments, the unit could be capable of achieving and maintaining temperatures of at least 300 degrees F., or at least 400 degrees F., either in discrete steps or continuously.

It is not necessary to the invention that power controller 30 be mounted separately. In another embodiment of the invention, power controller 30 could be mounted to the base unit in a number of possible ways, for example, a power controller could be mounted on an extended portion of the base unit. Alternatively, a small on-off switch could be provided on a side 20 of the base unit. A small control such as a knob or a slide, or other known controls, could be mounted on the base unit to control the on-off status of the unit and/or to continuously vary the temperature of the unit.

The top of the heating plate 12 need not be flat. It could have either shallow or deep grooves for channeling grease or other fluids away from the item being heated or cooked or for other purposes. In another embodiment, the invention need not be a flat griddle, but could be an electrically heated cooking or heating pan or dish in which heating plate 12 is merely the flat bottom surface of a pan or dish having upwardly extending edges. In such an embodiment, it would be desirable that the power cord be easily disconnected from the unit so that the unit can be easily separated from the power controller and washed.

Additionally, it may be desirable to have the power cord 28 in FIG. 1 be disconnectable via a plug from base unit 18, so that the unit can be separately conveniently handled without the power cord 28 connected, so that the power supply 30/36 can be replaced if faulty, or so that different power supplies can be sold and used with the unit to operate the unit at any one of a plurality of desired fixed temperatures, or at different variable temperatures. For example, a fast food chain restaurant might wish to use the unit for heating tortillas, and therefore want the unit shipped with a power supply that will operate the unit at only 200 degree F. or off. A different restaurant might want the unit for a variety of possible uses, and therefore want the unit shipped with a power supply that will allow the user to continuously vary the temperature of the unit from 150 degrees to 400 degree F. By making the power supply 30/36 detachable from the unit via a power plug, the same griddle can be shipped to a variety of different customers and used by those customers in a variety of different ways according to the specifics of the power supply 30/36 to which it will be attached. It should be noted that although the present invention is well suited for use within restaurants, cafeterias, and the like, the invention could also be used for domestic cooking and other cooking or heating applications.

It will be appreciated that the term "present invention" as used herein should not be construed to mean that only a single invention having a single essential element or group of elements is presented. Although the present invention has thus been described in detail with regard to the preferred embodiments and drawings thereof, it should be apparent to those skilled in the art that various adaptations and modifications of the present invention may be accomplished without departing from the spirit and the scope of the invention. Accordingly, it is to be understood that the detailed description and the accompanying drawings as set forth hereinabove are not intended to limit the breadth of the present invention, which should be inferred only from the following claims and their appropriately construed legal equivalents.

What is claimed is:

1. A super thin yet high temperature assembly for heating food comprising:

a generally flat metal plate having a top surface and an underside, for directly contacting a food item placed on said top surface;

a heating blanket being vulcanized to the underside of said metal plate, said heating blanket comprising silicone and covering at least 75% of said metal plate underside, said heating blanket being less than 0.5 cm thick;

a base disposed beneath said plate, said base including a bottom surface, side walls, and top walls, said top walls extending at least partially underneath said metal plate;

a first thermal insulation material comprising ceramic insulation material contained within said base; and capable of withstanding sustained temperatures of at least 500 degrees F.; and a second thermal insulation material disposed between said metal plate and said base top wall in a region in which said metal plate overlies said top wall;

wherein said assembly is less than 6 cm tall from a surface ion which said assembly is placed to said metal plate top surface.

2. An assembly according to claim 1 wherein:

said second thermal insulation material is selected from the group consisting of mica and phenolic sheet.

3. An assembly according to claim 1 wherein said metal plate, said heating blanket, and said base define a food heating unit, said assembly further comprising an electrical power controller electrically connected to said food heating unit, said controller being spatially separated from food heating unit and not rigidly mounted thereto.

4. An assembly according to claim 3 wherein said food heating unit is supported between vertical support members, and said controller is mounted to one of said vertical support members.

5. An assembly according to claim 1 further comprising a voltage converter for providing electrical energy to said heating blanket at a voltage of less than 25 volts.

6. A thin yet high temperature food warming assembly comprising:

a heat distribution panel for warming food;

a thin flexible sheet comprising a heating element and fiberglass reinforcement, said flexible sheet being permanently adhered to said heat distribution panel by a vulcanizing process;

a thin layer of ceramic insulation disposed beneath said flexible sheet for insulating heat generated within said flexible sheet from at least a bottom surface of said assembly;

a base for holding said ceramic insulation; and a power controller electrically connected to said flexible sheet for controlling electrical power dissipated within said flexible sheet;

wherein said flexible sheet covers at least about one half of a bottom surface of said heat distribution panel;

said base including metal edges extending upward and over thereby forming upper base edges extending beneath at least an outer portion of said heat distribution panel; and said assembly further comprises a second insulation material insulating said heat distribution panel from said upper base edges.

7. An assembly according to claim 6 wherein said second insulation material is mica.

8. A super thin yet high temperature assembly for heating food comprising:

a generally highly thermally conductive plate having a top surface and an underside, for directly contacting a food item placed on said top surface;

a heating blanket being vulcanized to the underside of said plate, said heating blanket being less than 0.5 cm thick;

a base disposed beneath said plate, said base including a bottom surface, side walls, and top walls, said top walls extending at least partially underneath said plate;

a first thermal insulation material comprising ceramic insulation material contained within said base, and a second thermal insulation material disposed between said highly thermally conductive plate and said base top walls in a region in which the highly thermally conductive plate overlies said top walls;

wherein said assembly is less than 6 cm tall from a surface on which said assembly is placed to said plate top surface.

* * * * *